United States Patent
Pail et al.

(10) Patent No.: US 7,468,988 B2
(45) Date of Patent: Dec. 23, 2008

(54) METHODS AND SYSTEMS FOR IMPROVING UTILIZATION OF HIGH-SPEED TIME DIVISION MULTIPLEXED COMMUNICATIONS LINKS AT SIGNAL TRANSFER POINT

(75) Inventors: Michael R. Pail, Cary, NC (US); Phillip C. Jerzak, Jr., Raleigh, NC (US); John R. Lenns, Raleigh, NC (US); Todd Eichler, Wake Forest, NC (US); Neil Tomlinson, Ascott (GB); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 956 days.

(21) Appl. No.: 10/225,998

(22) Filed: Aug. 22, 2002

(65) Prior Publication Data

US 2003/0091070 A1    May 15, 2003

Related U.S. Application Data

(60) Provisional application No. 60/314,128, filed on Aug. 22, 2001.

(51) Int. Cl.
*H04J 3/16* (2006.01)
(52) U.S. Cl. .................. 370/466; 370/442; 370/537
(58) Field of Classification Search .............. 370/231, 370/232, 235, 464, 465, 466, 467, 537, 538, 370/522, 524, 539, 540, 545
See application file for complete search history.

(56) References Cited

U.S. PATENT DOCUMENTS

| | | | |
|---|---|---|---|
| 5,384,840 A | | 1/1995 | Blatchford et al. |
| 5,602,828 A | * | 2/1997 | Engdahl et al. ............. 370/228 |
| 5,619,489 A | * | 4/1997 | Chang et al. ............... 370/241 |
| 5,838,782 A | | 11/1998 | Lindquist |
| 5,878,129 A | | 3/1999 | Figurski et al. |
| 5,926,482 A | | 7/1999 | Christie et al. |
| 5,940,393 A | * | 8/1999 | Duree et al. ................. 370/392 |
| 6,014,378 A | * | 1/2000 | Christie et al. .............. 370/356 |
| 6,031,840 A | * | 2/2000 | Christie et al. .............. 370/410 |
| 6,137,800 A | * | 10/2000 | Wiley et al. ............ 370/395.51 |
| 6,157,659 A | * | 12/2000 | Bird .......................... 370/538 |
| 6,260,071 B1 | * | 7/2001 | Armistead et al. .......... 709/238 |
| 6,459,708 B1 | * | 10/2002 | Cox et al. ................... 370/537 |

(Continued)

OTHER PUBLICATIONS

"Synchronous Optical Network (SONET)", International Engineering Consortium, Mar. 22, 2002, pp. 1-5 USA.

(Continued)

*Primary Examiner*—Chi H. Pham
*Assistant Examiner*—Kevin Mew
(74) *Attorney, Agent, or Firm*—Jenkins, Wilson, Taylor & Hunt, P.A.

(57) ABSTRACT

A multi-port link interface capable of high-speed time division multiplexed communications at a signal transfer point is disclosed. In one implementation, the multi-port link interface module is located in the signal transfer point, terminates two or more high-speed TDM links and generates internal data. Data received on one high-speed communications link is combined with the internal data used to fill outbound timeslots in an outgoing high-speed link. The data may include signaling data, bearer data, or signaling and bearer data.

45 Claims, 9 Drawing Sheets

U.S. PATENT DOCUMENTS

| | | | |
|---|---|---|---|
| 6,519,257 B1 | 2/2003 | Brueckheimer et al. | |
| 6,600,742 B1* | 7/2003 | Hiromori et al. | 370/376 |
| 6,636,478 B1* | 10/2003 | Sensel et al. | 370/216 |
| 6,643,791 B1* | 11/2003 | Teodorescu | 713/500 |
| 6,678,242 B1* | 1/2004 | Simon | 370/218 |
| 6,714,560 B1* | 3/2004 | Drover et al. | 370/467 |
| 6,778,488 B1* | 8/2004 | Long et al. | 370/216 |
| 6,781,985 B1* | 8/2004 | Feder et al. | 370/376 |
| 6,847,652 B1* | 1/2005 | Fourcand et al. | 370/438 |
| 6,973,072 B1* | 12/2005 | Muntz | 370/351 |
| 2003/0002491 A1* | 1/2003 | Christie | 370/356 |
| 2003/0016699 A1* | 1/2003 | McClary et al. | 370/474 |
| 2003/0120553 A1* | 6/2003 | Williams | 705/26 |

OTHER PUBLICATIONS

"Network and Customer Installation Interfaces-DS1 Electrical Interface", American National Standards Institute, 1999, pp. i-ix, 1-64, USA.

"Network and Customer Installation Interfaces-Integrated Services Digital Network (ISDN) Primary Rate Layer 1 Electrical Interface Specification", American National Standards Institute, 1999, pp. i-viii, 1-22 USA.

"Grooming of Arbitrary Traffic in SONET/WDM BLSRs", IEEE Journal on Selected Areas in Communications, vol. 18, No. 10 (2000).

"Signaling Extender," RadiSys., p. 1-2, (2002).

"Signaling Gateway," RadiSys., p. 1-2, (2002).

"Signaling Router," RadiSys., p. 1-2, (2002).

"Tunneling Gateway," RadiSys., p. 1-2 (2002).

Supplementary European Search Report for European Patent Application No. 02757288.2-1249 (Mar. 13, 2008).

Marx et al., "System 12 Signaling Transfer Point," Electrical Communication, vol. 62, No. 2, pp. 202-208 (Nov. 11, 1988).

J. Lamy, "Signaling Transfer Point DPC700," Electrical Communication, vol. 62, No. 2, pp. 174-177 (Nov. 11, 1988).

Langlois et al., "DMS SuperNode: The Cornerstone of a CCS7 Network," Telesis, vol. 15, No. 2, pp. 17-27 (1988).

Communication pursuant to Article 94(3) EPC corresponding to European Patent Application No. 02757288.2-1249 (Jul. 21, 2008).

* cited by examiner

METHODS AND SYSTEMS FOR IMPROVING UTILIZATION OF HIGH-SPEED TIME DIVISION MULTIPLEXED COMMUNICATIONS LINKS AT SIGNAL TRANSFER POINT

RELATED APPLICATIONS

This application claims the benefit of U.S. Provisional Patent Application Ser. No. 60/314,128, filed Aug. 22, 2001, the disclosure of which is incorporated herein by reference in its entirety.

TECHNICAL FIELD

The present invention relates to methods and systems for add/drop multiplexing in a signal transfer point. More particularly, the present invention relates to methods and systems for combining internal data processed by a signal transfer point with received data channels and forwarding the combined data over an outbound time division multiplexed communications link to improve utilization of the communications link.

BACKGROUND ART

In conventional telecommunications signaling networks, signal transfer points terminate SS7 signaling links that carry signaling data and no bearer data. Each signaling link consists of bi-directional time division multiplexed channels. In conventional networks, the signaling links terminated by signal transfer points are typically 56 kbps or 64 kbps DS-0 links.

In order to transfer signaling information across long distances, many DS-0 channels may be multiplexed into a single high-speed link, such as a DS-1 or E1 link. A DS-1 link uses a T1 carrier, which operates at 1.544 Mbps. Thus, a DS-1 link consists of 24 64 kbps DS-0 channels. An E1 link uses a carrier that operates at 2.048 Mbps. Thus, an E1 link consists of 32 64 kbps DS-0 channels.

Since conventional signal transfer points are incapable of processing such high-speed links, external channel banks are required at each STP in the network. External channel banks include multiplexers and demultiplexers that multiplex and demultiplex a T1 or E1 link that carries signaling information to and from a signal transfer point. FIG. 1 illustrates a conventional signal transfer point with external channel banks. Referring to FIG. 1, signal transfer point 100 terminates DS-0 channels $DS-0_1$-$DS-0_{24}$. Similarly, since signaling links are bi-directional, signal transfer point 100 also outputs DS-0 channels $DS-0_1$-$DS-0_{24}$.

Since DS-0 signals are transported by high-speed T1 carriers, channel banks 102 and 104 are required to multiplex and demultiplex channels to be processed by signal transfer point 100. More particularly, channel bank 102 demultiplexes a DS-1 signal carried over a T1 carrier into 24 DS-0 channels, and channel bank 104 multiplexes 24 DS-0 channels into a DS-1 link for transmission over a T1 carrier.

As illustrated in FIG. 1, channel banks 102 and 104 are hardware components external to STP 100. Using external channel banks is undesirable because such equipment consumes space in telecommunications facilities and requires additional cables to carry the individual channels to and from the signal transfer point.

In order to reduce the need for external channel banks, signal transfer points that directly terminate some types of high-speed TDM channels have been developed. For example, the assignee of the present application has developed an E1 card capable of terminating an E1 signals at a signal transfer point. The E1 card receives an E1 signal from an external network, processes 8 of the 32 DS-0 channels on the card, and forwards the remaining channels to a downstream card for processing. Dividing the processing of the E1 signal among multiple cards allows low-speed hardware to be used to process a high-speed signal.

While the above-referenced E1 card scheme is capable of processing a high-speed signal at a signal transfer point, that solution does not provide a way for handling voice or bearer data at a signal transfer point or for filling an outbound link with data from multiple sources. These capabilities can be important within a carrier's network in order to maximize utilization of expensive T1 or E1 facilities. Accordingly, there exists a long-felt need for improved methods and systems for filling channels in an outbound communications facility at a signal transfer point with data from different sources.

DISCLOSURE OF THE INVENTION

The present invention includes a signal transfer point for maximizing utilization of an outbound high-speed communications link by filling timeslots on the communications link with data from multiple different sources. The data may include signaling data from inbound SS7 signaling links, bearer data from inbound voice links, and outbound data that has been processed or routed by the signal transfer point. The bearer data may include voice data, video data, non-voice audio data, and/or user data. Filling timeslots in outbound communications links with data from multiple sources increases the utilization efficiency of these high-speed communications links. As a result, the number of required high-speed communications links and associated channel banks required in a carrier's network are reduced.

Accordingly, it is an object of the present invention to provide methods and systems for improving the utilization of high-speed communications links at a signal transfer point.

It is another object of the invention to provide a signal transfer point capable of receiving voice traffic and for mixing the voice traffic with signaling traffic on an outbound communications link.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings, of which.

DETAILED DESCRIPTION OF THE INVENTION

A signal transfer point according to an embodiment of the present invention is capable of filling high-speed outbound communications links with data from different sources. For example, the signal transfer point may receive signaling data on some of its communications links and voice data on other communications links. The signal transfer point may combine the signaling and voice data with internally processed data and load the combined data onto an outbound communications link. As used herein, "internally processed data" or "internal data" refers to signaling data being routed or otherwise processed by the signal transfer point. These terms are also intended to include signaling data generated by the signal transfer point.

In addition to combining received data with internally processed data, a signal transfer point may perform pure cross connect and multiplexing functions for communications links that it terminates. For example, a signal transfer point may terminate a T1 link carrying signaling data only over a long distance, such as from New York to Los Angeles. Normally, a signal transfer point would process the signaling data by examining the routing information in the signaling data and routing the signaling data to its intended destination. However, in performing a pure cross connect function, a signal transfer point of the present invention may simply cross connect the signaling information from one inbound T1 communications link to an outbound T1 communications link. In performing a multiplexing function, a signal transfer point may combine data from multiple received T1 communications links and send the data over a single higher-speed link, such as a T3 link. The ability to cross-connect and multiplex high-speed links at a signal transfer point allows signal transfer points to replace external channel banks and cross connects in a network.

Figure 1:
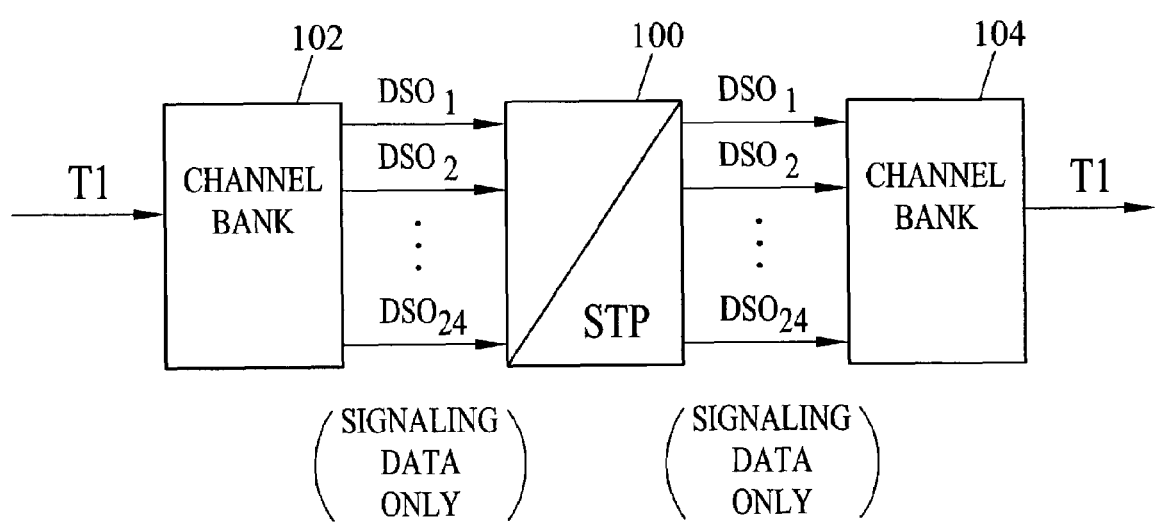
FIG. 1 is a block diagram of a conventional signal transfer point and channel banks capable of sending and receiving only signaling data.
Figure 2:
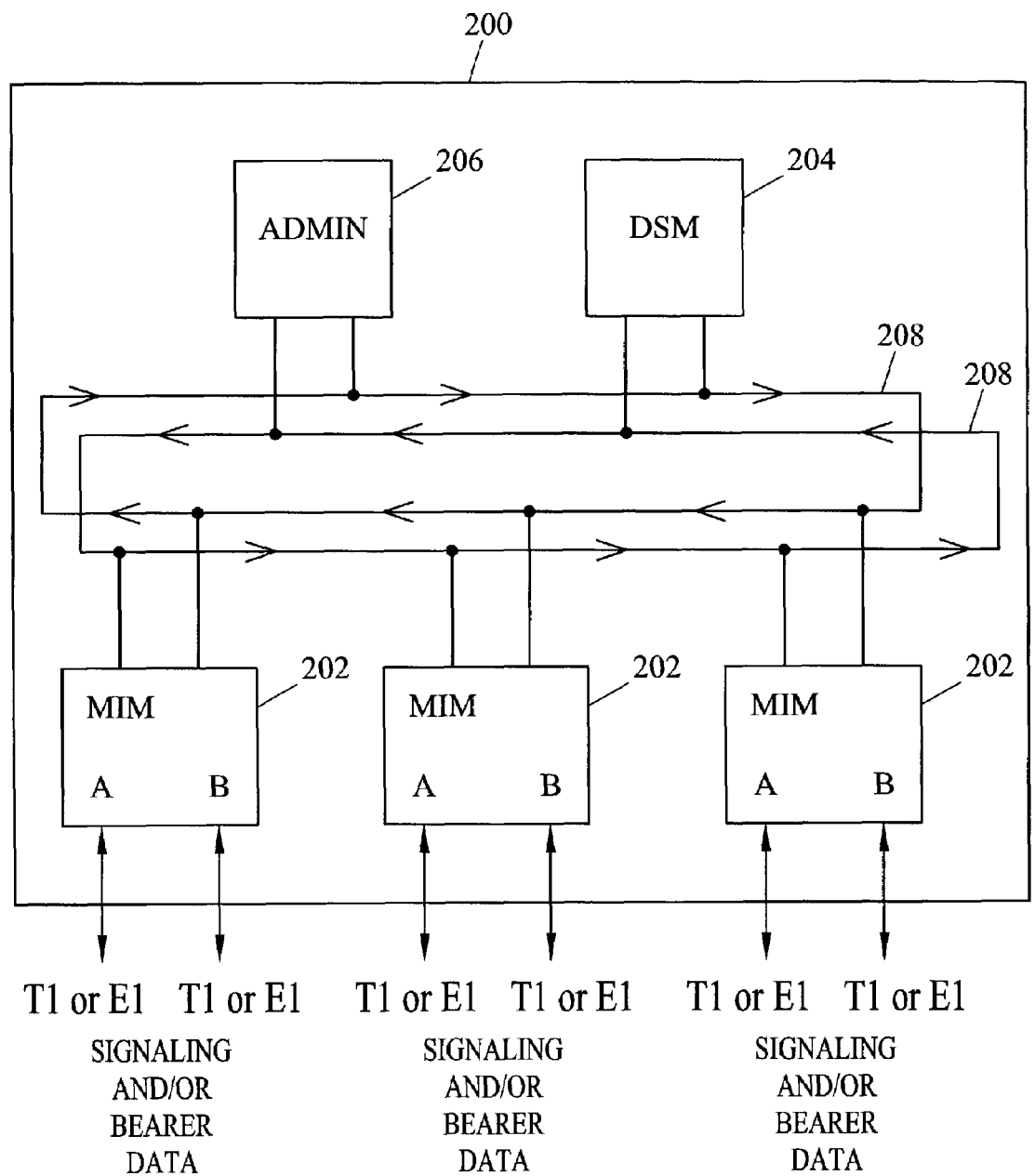
FIG. 2 is a block diagram of a signal transfer point including a plurality of multi-interface link interface modules (MIMs) for receiving voice and signaling data and for filling timeslots on outbound communications links with voice data, external signaling data and internal signaling data according to an embodiment of the present invention.

FIG. 2 illustrates an exemplary signal transfer point architecture according to an embodiment of the present invention. Referring to FIG. 2, signal transfer point 200 includes a plurality of multi-port link interface modules (MIMs) 202 for interfacing directly with T1 or E1 communications links that carry signaling data, bearer data, or signaling data and bearer data. In the illustrated embodiment, each MIM 202 includes an A port and a B port, each capable of bi-directional E1 or T1 communications.

Signal transfer point 200 may also include one or more internal processing modules, such as database service module (DSM) 204 and administrative module 206 that do not interface directly with external communications links. For example, DSM 204 may provide database-related services, such as global title and number portability translations. Administrative module 206 may perform database provisioning and other administrative functions. Although not illustrated in FIG. 2, signal transfer point 200 may also include one or more data communications modules (DCMs) for sending and receiving SS7 messages over an IP network.

Each of the modules within STP 200 may be a printed circuit board with one or more processors mounted thereon. In one exemplary implementation, each module may include an application processor for executing application programs and a communications processor for communicating with other modules. Modules 202, 204, and 206 may be connected by one or more buses 208 for providing interprocessor communications. In the illustrated example, buses 208 comprise a pair of counter-rotating dual rings.

As stated above, MIMs 202 are preferably capable of interfacing directly with T1 or E1 communications links including both signaling and bearer data and for loading outbound communications links with either or both types of data. In addition to loading outbound communications links with multiple types of data, MIMs 202 may perform cross-connect functions where data from one high-speed communications link is transmitted over timeslots in another communications link of the same speed. In addition, MIMs 202 may perform a multiplexing function where data received over multiple high-speed links, such as T1 links, are multiplexed and sent over a higher-speed link of the same or of a different type, such as a T3 or an OC-3 link. These multi-source outbound link loading, cross-connection, and multiplexing functions have not been previously provided at a signal transfer point.

Figure 3:
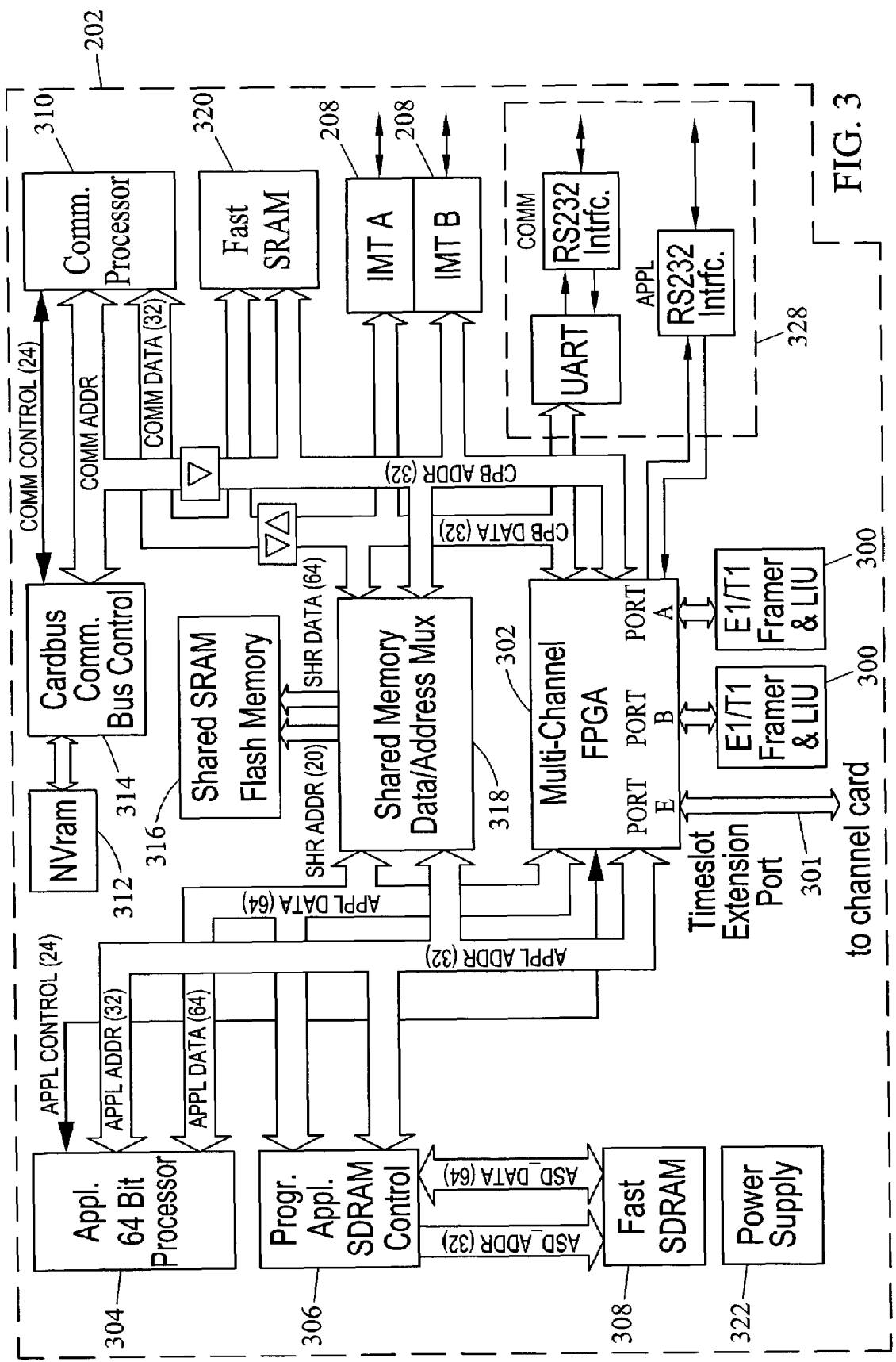
FIG. 3 is a block diagram illustrating an exemplary internal architecture for a MIM according to an embodiment of the present invention.

FIG. 3 is a block diagram illustrating exemplary components of MIM 202 according to an embodiment of the present invention. In FIG. 3, MIM 202 includes E1/T1 framer chips 300 for performing physical layer and framing functions for sending and receiving T1 and E1 signals. In the illustrated example, two framer chips 300 are included because MIM 202 terminates two T1 or E1 links—one for port A illustrated in FIG. 2 and one for port B. A timeslot extension port 301 allows MIM to offload received data that it is incapable of processing to other MIM cards. A field programmable gate array (FPGA) 302 includes internal logic for sending and receiving data over port A and port B and for loading the outbound side of port A with data from multiple sources. The internal structure of FPGA 302 will be discussed in detail below.

An application processor 304 runs SS7 protocol software, including MTP layers 3 software resident on memory 306. An SDRAM 308 stores data, such as SS7 routing tables, used by application processor 304. A communications processor 310 controls communications over IMT buses 208 and over the internal bus on MIM 202. A nonvolatile RAM 312 stores configuration information for bus controller 314. Processors 304 and 310 both read and write to shared memory 316 using shared memory data/address multiplexer 318. A fast SRAM 320 stores data tables used by communications processor 310. A power supply 322 provides operational power to the components of MIM 202. A diagnostic interface 328 provides serial diagnostic interfaces to application processor 304 and communications processor 310.

Outbound Link Loading Functionality

Figure 4:
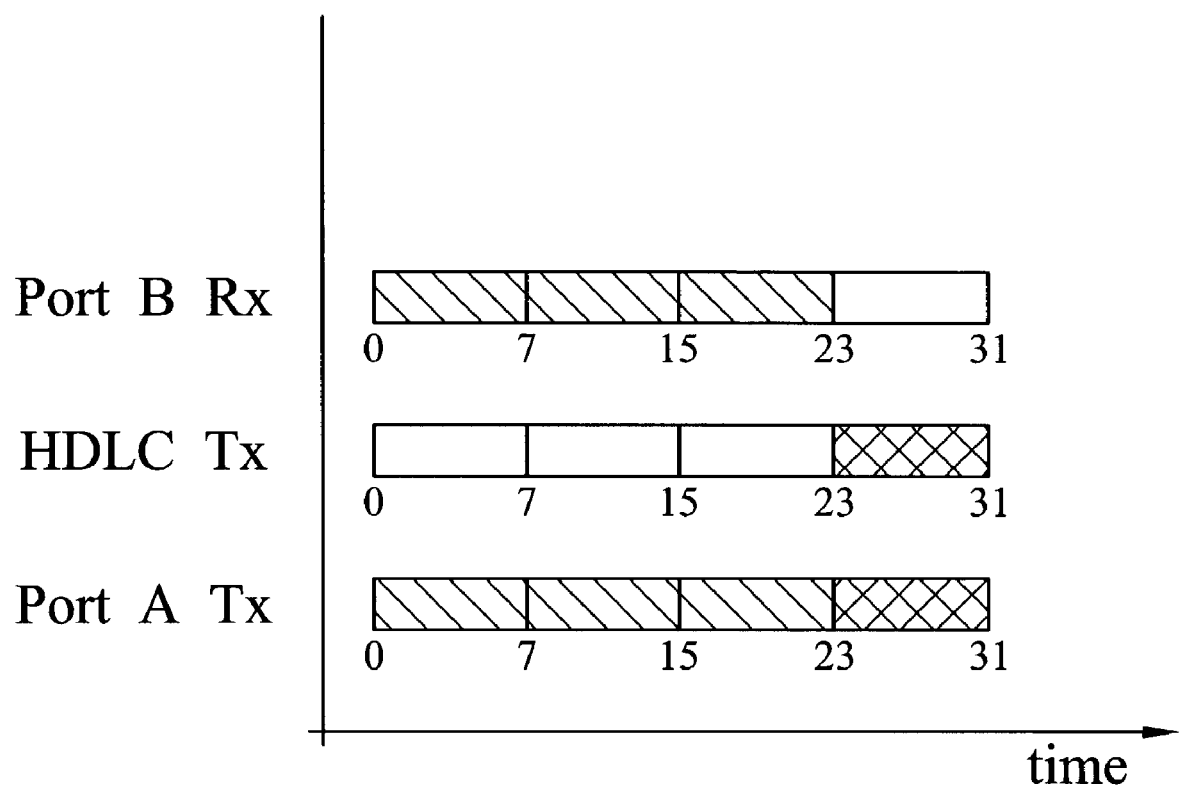
FIG. 4 is a timing diagram illustrating exemplary filling of an outbound communications link with data from multiple sources by a MIM according to an embodiment of the present invention.

As stated above, MIM 202 is capable of combining different types of data from different sources and using the data to fill an outbound communications link. FIG. 4 is a timing diagram illustrating the outbound link loading functionality of MIM 202. Referring to FIG. 4, each line in the timing diagram represents an E1 frame consisting of 32 DS-0 channels. The first line in the timing diagram represents data received on port B. In this example it is assumed that channels 1-23 received on port B contain packetized voice. The second line in the timing diagram represents data to be sent out into the network. This data may include signaling data being cross-connected from another communications link or internal data that has been processed by signal transfer point 200. The third line in the timing diagram represents the combination of the data in lines 1 and 2 to be sent out the transmit side of port A. In this example, the outbound frame is completely full and includes intermixed signaling and voice data. Such capabilities have not been provided in previous signal transfer point implementations. Exemplary components for providing the functionality illustrated in FIG. 4 in a signal transfer point will now be described in detail.

Figure 5:
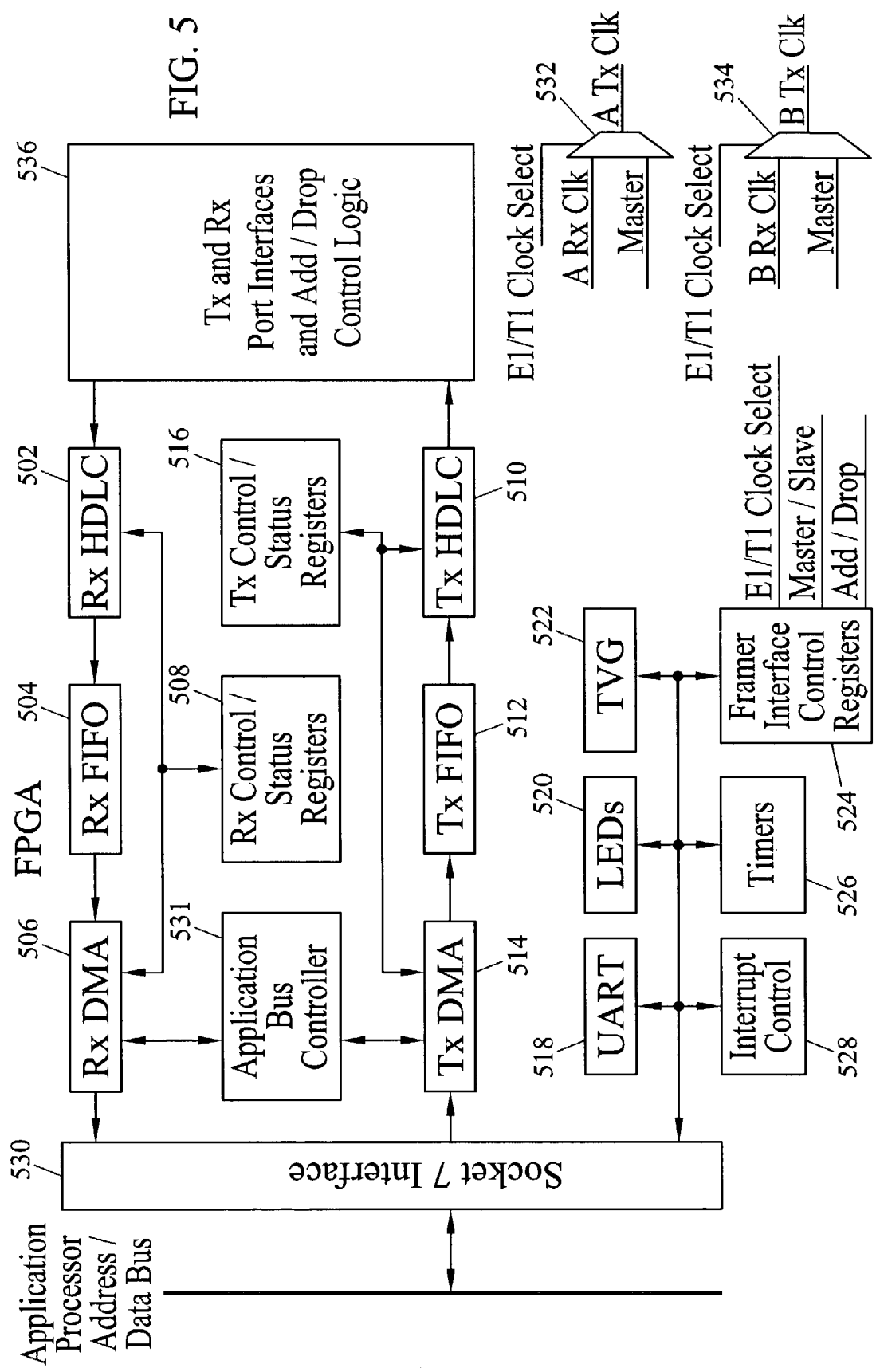
FIG. 5 is a block diagram illustrating exemplary MIM FPGA components according to an embodiment of the present invention.

FIG. 5 is a block diagram illustrating exemplary components of FPGA 302 illustrated in FIG. 3. In FIG. 5, FPGA 302 includes receive side components 502, 504, 506, and 508 and transmit side components 510, 512, 514, and 516 for sending and receiving data over the communications ports. More particularly, Rx HDLC 502 performs datalink control functions for ensuring datalink layer communications with a directly-connected node. Rx FIFO 504 stores data received from ports A and B. Rx DMA 506 controls direct memory access to shared memory 318 illustrated in FIG. 3. Rx control register 508 stores control and status data for Rx HDLC 502 and Rx DMA 506. Transmit side components 510, 512, 514, and 516 perform functions for the transmit side similar to the corresponding components of the receive side.

Universal asynchronous receiver transmitter (UART) 518 provides a serial diagnostic interface to application processor 304 illustrated in FIG. 3. LED control 520 controls external LEDs that indicated the status of MIM 202. 302. Ticket voucher generator 522 generates ticket vouchers used to control the flow of data between cards within signal transfer point 200. Frame interface control registers 524 store control information for the frame interfaces, such as clock selection data, master/slave configuration data, and add/drop control data. Timers 526 perform timing for ticket vouchers and synchronization between cards within signal transfer point 200. Interrupt controller 528 controls application processor interrupts generated by FPGA 302. The components of FPGA 302 communicate with application processor 304 via socket 7 interface 530 and application bus controller 531. Multiplexers 532 and 534 control transmit clock selection for the A and B interfaces based on the clock selection data stored in registers 524.

Figure 6:
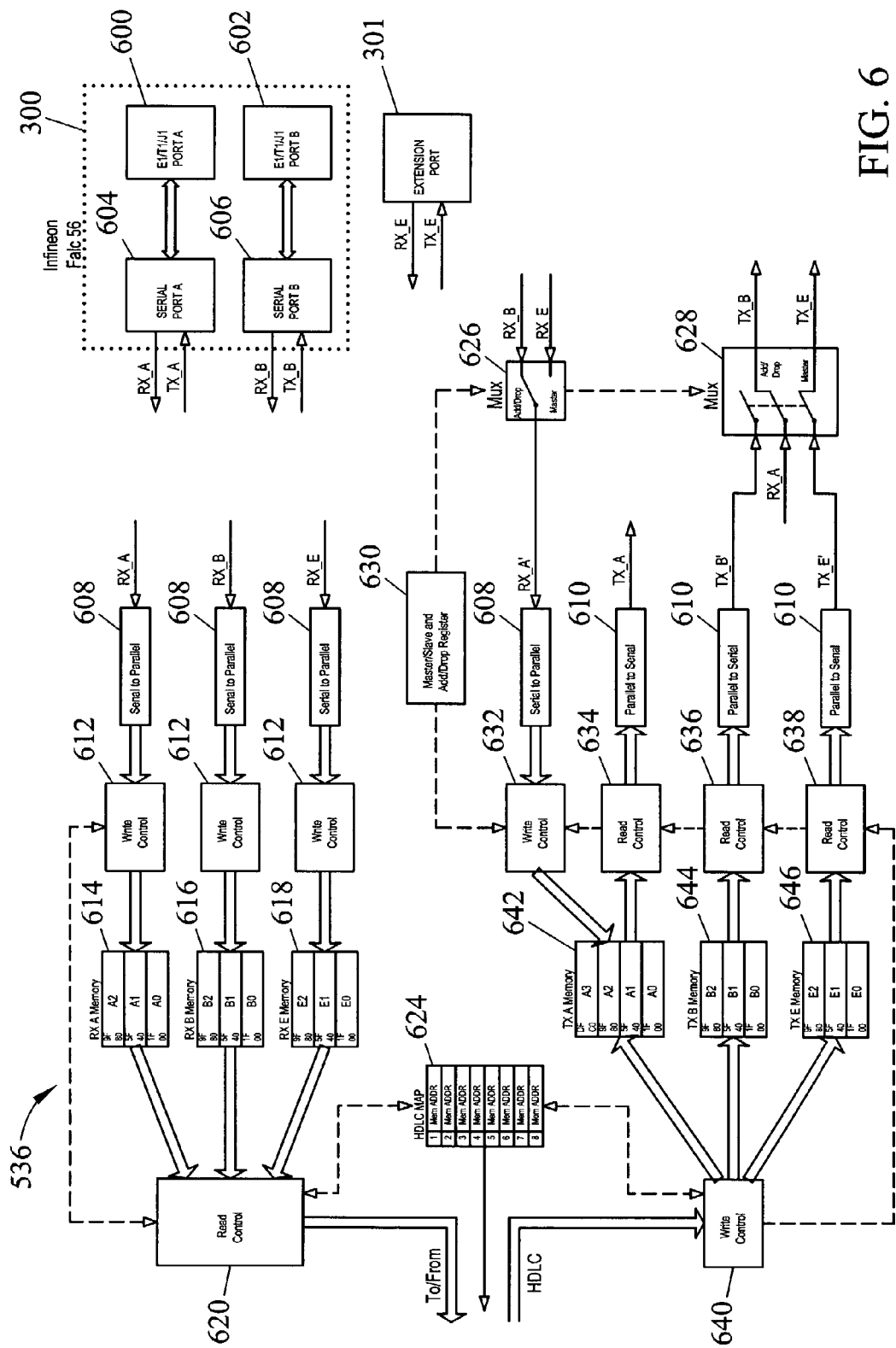
FIG. 6 is a block diagram illustrating exemplary components of a MIM FPGA associated with filling an outbound communications link with data from different sources according to an embodiment of the present invention.

According to an important aspect of the invention, FPGA 302 includes Tx and Rx port interfaces for ports A and B and add drop control logic 536 for combining data from different sources to improve the utilization of a high-speed outbound communications link. FIG. 6 illustrates exemplary components of add/drop and interface control logic 536, framer 300, and extension port 301. In the illustrated embodiment, framer 300 includes E1/T1/J1 electrical interfaces 600 and 602 for interfacing directly with external communications links and internal serial ports 604 and 606 for the A and B interfaces. Extension port 301 does not include framing chips since it simply passes data between cards.

Serial data received via the receive interfaces of the A, B, and E ports are converted to parallel by serial to parallel converters 608. Similarly, data to be transmitted over ports A, B, and E may be converted from parallel to serial format by parallel to serial converters 610. On the receive side, logic 536 includes components that receive data from the A, B, and E ports. In the illustrated example, these components include write controllers 612, Rx data memories 614, 616, and 618, and read controller 620. Write controllers 612 and read controller 620 control the reading and writing of received data to and from memories 614, 616, and 618. In the illustrated example, memories 614, 616, and 618 each include 3 banks, each capable of storing one E1 frame of data (32 8-bit DS-0 channels). More particularly, each bank in Rx A memory 614 is capable of storing one frame of E1 data received on port A, each bank in Rx B memory 616 is capable of storing one frame of E1 data received on port B, and each bank in Rx E memory 614 is capable of storing one frame of E1 data received on port E. At each frame time, one bank in each of memories 614, 616, and 618 is unused (i.e., not read from or written to) to prevent data overwriting. Data read from memories 614, 616, and 618 is written to Rx HDLC 502 illustrated in FIG. 5 using address data stored in HDLC map 624. The process of reading data from and writing data to successive memory banks is repeated in a round-robin fashion.

The transmit side of logic 536 includes functionality in addition to standard transmit components for providing the add/drop output link loading functionality described herein. In FIG. 5, these additional components include multiplexers 626 and 628, master/slave and add/drop register 630, interconnected read and write controllers 632, 634, 636, 638, and 640, and memories 642, 644, and 646. Multiplexers 626 and 628 function as switches to enable add/drop mode based on data stored in master/slave and add/drop register 630. In the illustrated example, the "switches" in multiplexers 626 and 628 are shown in the closed position to enable add/drop mode. The switches are configured such that data received from ports A and B are combined with data from TX HDLC 510 illustrated in FIG. 5 and used to load the transmit side of port A.

Read and write controllers 632, 634, 636, 638 read data from and write data to memories 642, 644, and 646 in a round-robin fashion similar to the corresponding receive components. Memories 642, 644, and 646 store data to be sent over outbound T1 and E1 links. In particular, each bank in memory 642 is capable of storing one frame of E1 data (32 8-bit DS-0 channels). Tx HDLC 510 illustrated in FIG. 5 writes to memory 642 illustrated in FIG. 6. However, Tx HDLC 510 is preferably capable of only writing a portion of an E1 frame during an E1 frame interval. The data from Tx HDLC 510 is combined with data from the Rx side of port B and sent over port A, as will be described in detail below. One bank in memory 642 preferably remains empty during each frame interval to prevent HDLC data from being overwritten before it is read. Thus, memory 642 allows data from multiple sources to be combined and sent over a single outbound link. A method for reading data to and from this memory for providing add/drop data intermixing will be described in detail below.

Memories 644 and 646 store data to be transmitted over ports B and E, respectively. In the illustrated example, each bank in memory 644 is capable of storing one frame of E1 data to be transmitted over port B, and each bank in memory 646 is capable of storing one frame of E1 data to be sent to an adjacent card over port E. Like the other memories described above, one bank in memories 644 and 646 is preferably unused during each frame interval to prevent over-writing of data before it is read.

Figure 7A:
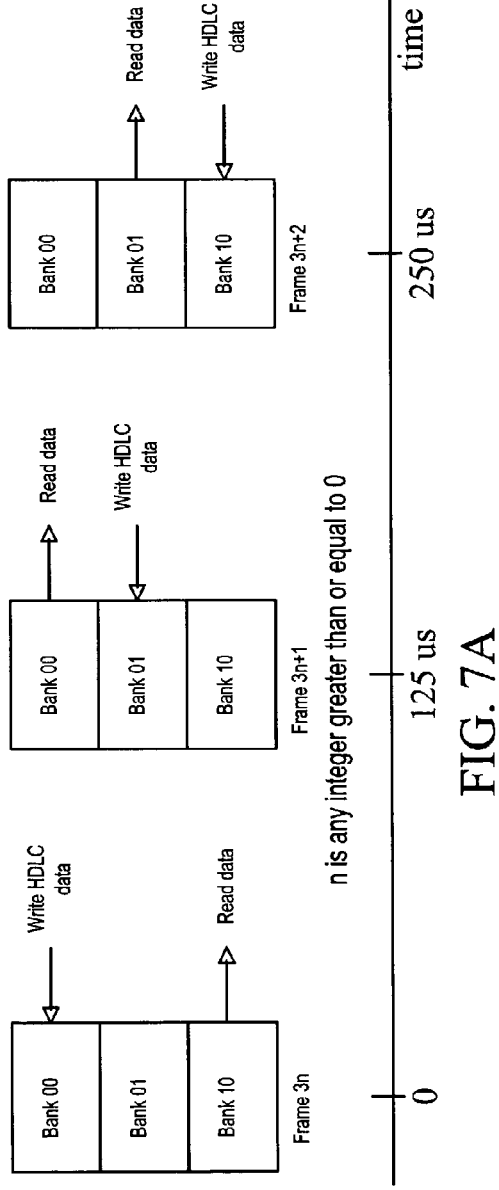
FIG. 7 is a block/timing diagram illustrating exemplary memory banks of a MIM FPGA and the successive writing of data therein associated with filling an outbound communications link with data from different sources according to an embodiment of the present invention.
Figure 7B:
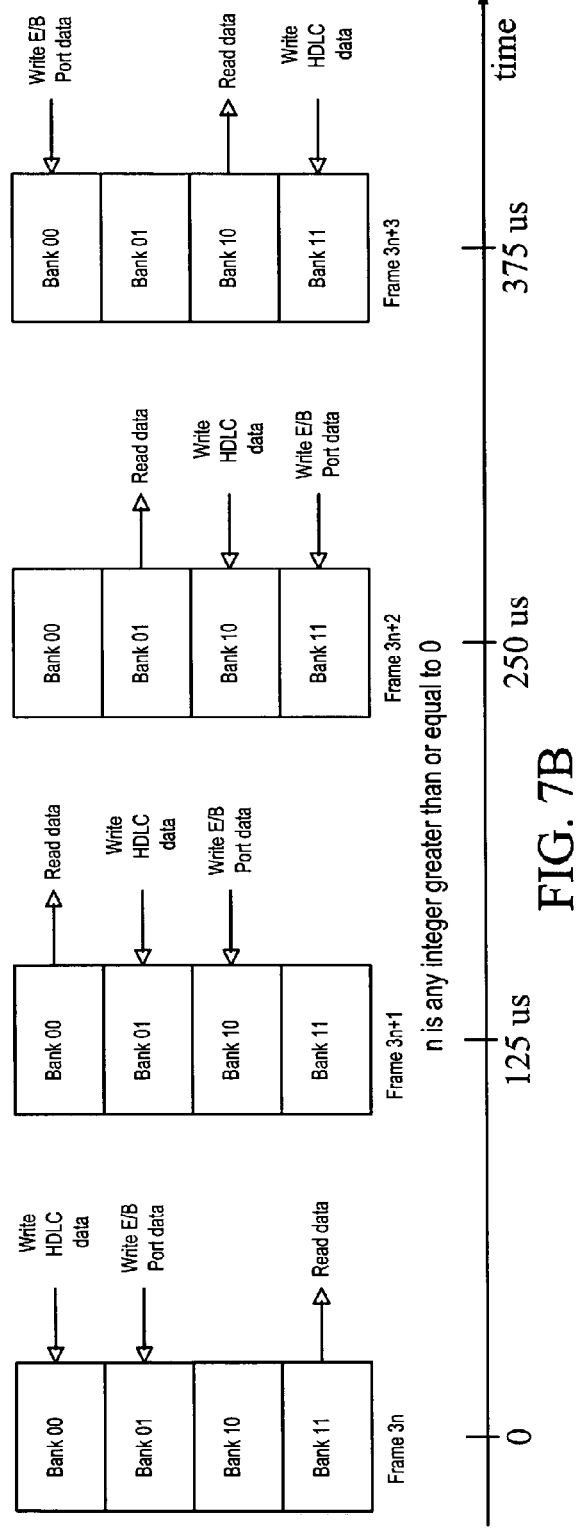

FIGS. 7A and 7B are timing diagrams illustrating an exemplary method for reading data from and writing data to the memories illustrated in FIG. 6. More particularly, FIG. 7A illustrates a method for writing data to and reading data from the memories other than memory 642, and FIG. 7B illustrates a method for writing data to and reading data from memory 642. In FIGS. 7A and 7B, the variable n is an integer used to indicate the frame time. Referring to FIG. 7A, each stack of blocks represents a snapshot of a memory and operations performed on various banks of that memory at a given frame time. For example, assuming n=0, at frame time 0, HDLC data is written to Bank 00 of the memory, data is read from bank 10 of the memory, and bank 01 is left unchanged. At frame time 1, the previously written HDLC data is read from bank 00, new HDLC data is written to bank 01, and no operations are performed on bank 00. The old frame B data in bank 01 is overwritten because it has already been read two frame times prior to the current frame time. At frame time 2, data is read from bank 01, written to bank 10, and bank 00 is left unchanged. The process continues in a round-robin fashion so that data is continuously written to and read from the various memory banks without overwriting unread data.

Referring to FIG. 7B, a method for combining data from multiple sources using memory 642 is illustrated. Assuming n=0, at frame time 0, HDLC data is written to bank 00, port B Rx data is written to bank 01, bank 10 is unaltered, and data is read from bank 11 and transmitted over the port A Tx interface. At frame time 1, the previously written HDLC data is read from bank 00, new HDLC data is written into bank 01, new port B data is written into bank 10, and bank 11 is left unaltered. As discussed above, Tx HDLC 510 is preferably only capable of over-writing a portion of the data stored in the memory banks. For example, Tx HDLC 510 may be configured to over-write only the first 8 bits of the data in each memory bank. Over-writing a portion of the data in a memory bank allows the processed data to be combined with received data. The network operator preferably configures received E1 data frames such that important data will not be over-written with processed HDLC data.

At frame time 2, bank 00 is unchanged, the combined HDLC and previously written port B Rx data is read from bank 01, HDLC data is written to bank 10, and port B data is written to bank 11. At time 3, port B data is written to bank 00, bank 01 is unchanged, the previously written HDLC and port B Rx data is read from bank 10, and HLDC data is written to bank 11. The process is repeated in a round-robin fashion such that data from different sources and even different types of data can be used to fully load or increase the loading of an outbound communications link.

Figure 8:
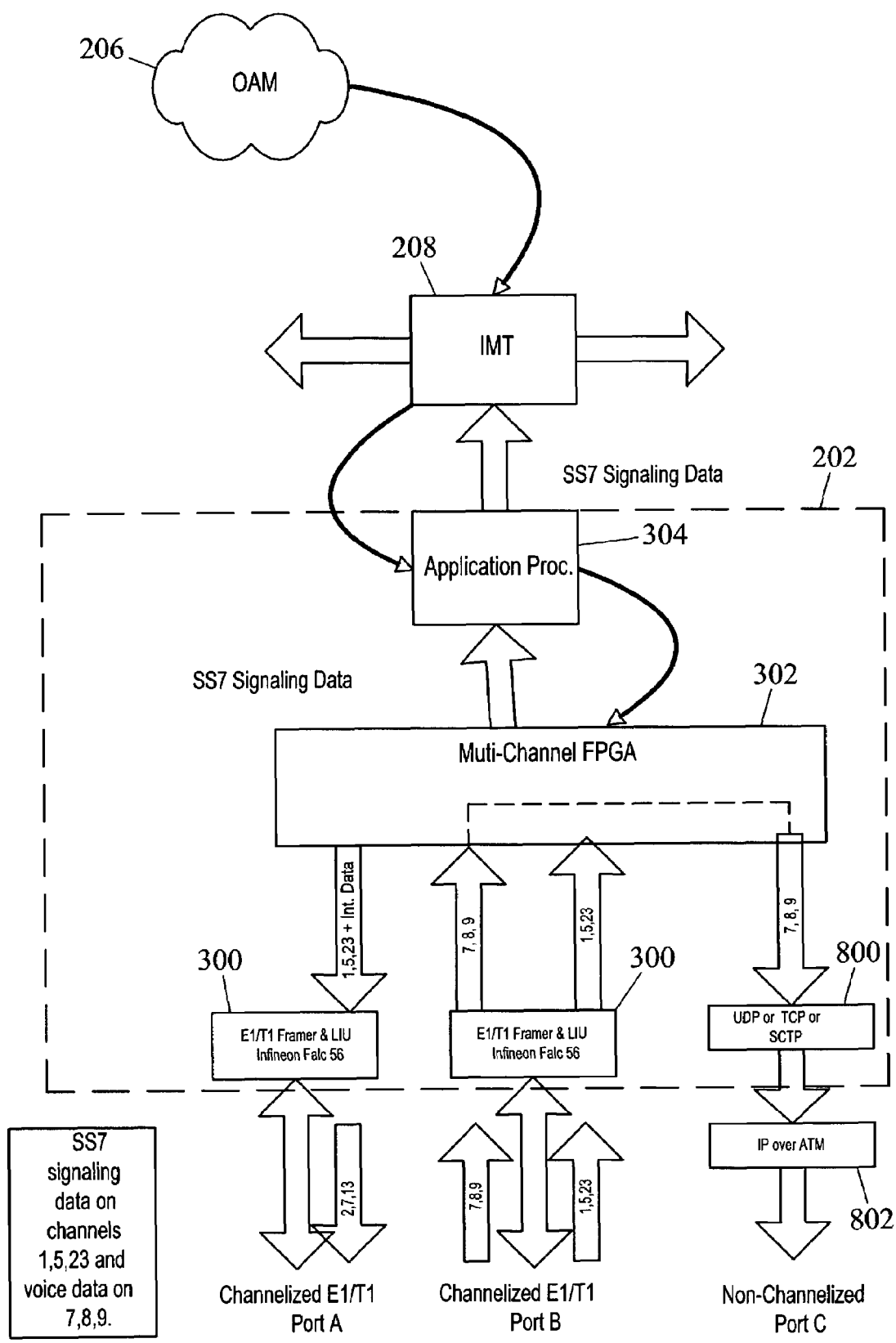
FIG. 8 is a block diagram of a MIM capable of converting data from channelized to non-channelized format according to an embodiment of the present invention.

While FIG. 4 illustrates the combining of data from multiple TDM streams to an outbound TDM stream, the present invention is not limited to such an embodiment. FIG. 8 illustrates an example in which incoming TDM data is separated, and part of the data is sent on a TDM stream while the remaining part is sent on a non-channelized stream. Referring to FIG. 8, channelized data arrives at MIM 202 on port B. In the illustrated example, timeslots 1, 5, and 23 of the incoming data are assumed to be signaling data, while channels 7, 8, and 9 are assumed to be voice data. If MIM 202 is performing a pure cross connect function for timeslots 1, 5, and 23, FPGA 302 may send the signaling data out on port A without sending the signaling data up to application processor 304 for routing or other processing. FPGA 302 may also "drop" some of the signaling channels to application processor 304 for further processing and cross-connect other signaling channels to empty timeslots on port A.

The voice data may also be sent out empty timeslots on port A. However, rather than sending the voice data on an outbound TDM communications link, FPGA 302 may send the voice data on a non-channelized UDP, TCP, or SCTP connection 800 running over an IP over ATM stack 802. IP over ATM stack 802 may provide AAL1 circuit emulation service for guaranteeing on-time delivery of voice packets. Such a conversion from channelized to non-channelized format allows ATM and other non-channelized physical layer protocols to be used to transfer data across a service provider's network.

The signaling data and/or the voice data being sent out over the network in FIG. 8 may be combined with internally processed data to be sent over the network. In the example illustrated in FIG. 8, the signaling data is sent over channelized port A. The voice data is diverted from port B to non-channelized port C for transmission over an IP network without leaving MIM 202. However, the present invention is not limited to such an embodiment. In an alternate embodiment, the voice data may be sent over IMT bus 208 to a DCM or other IP-capable card for transmission over the IP network. However, this embodiment is less preferred because it consumes application processor cycles and IMT bus bandwidth to get the voice data to the appropriate outbound card.

Figure 9:
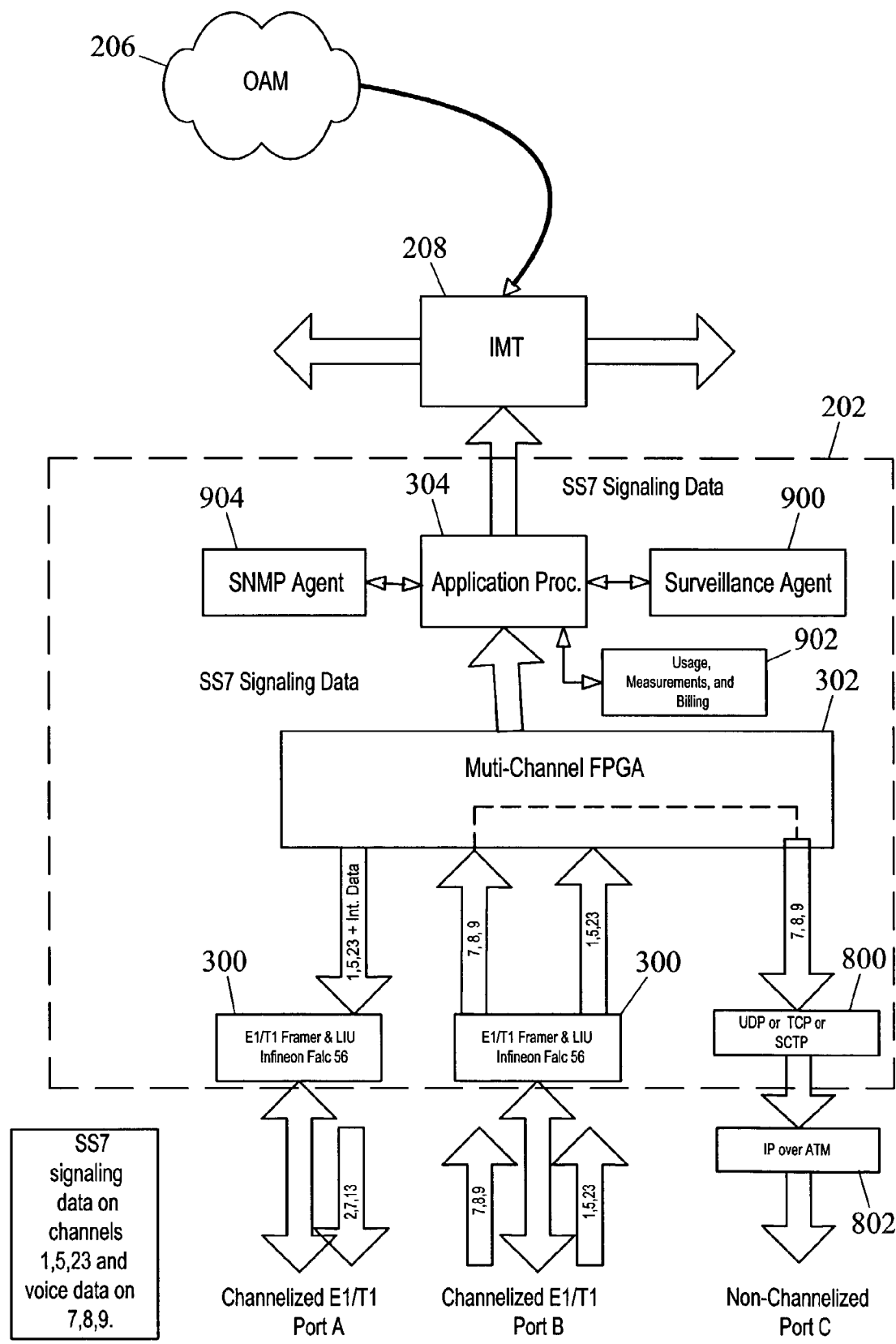
FIG. 9 is a block diagram of a MIM including SNMP, billing and surveillance agents according to an embodiment of the present invention.

FIG. 9 illustrates another application of MIM 202 according to an embodiment of the present invention. In FIG. 9, MIM 202 includes a surveillance agent 900, a usage measurements and billing agent 902, and a simple network management protocol agent 904. Surveillance agent 900 may direct FPGA 302 to copy predetermined media stream channels to an external monitoring system for surveillance purposes. Usage measurements and billing agent 902 may instruct FPGA 302 to copy predetermined signaling channels to a usage measurements and billing system. SNMP agent 904 may allow the user to control outbound timeslot assignment and monitor timeslot status using primitives and SNMP commands. Because signaling and voice channels can be copied below the application level and directed to the appropriate outbound communications link, network monitoring and surveillance functions can be performed with minimal impact on application processor 304.

As described above, the present invention is capable of combining data from multiple sources and of multiple different types to increase the utilization of a high-speed channelized communications link at a signal transfer point. Such capabilities allow STPs to replace expensive digital cross connect and channel bank hardware in a service provider's network. In addition, because the cross connection is performed at the hardware level, the load on the application processors of the link interface cards is not increased.

While the examples described herein use E1, T1, and J1 as examples of high-speed communications links that may be loaded with data from different sources, the present invention is not limited to loading links formatted only according to these standards. Loading any type of high-speed electrical or optical communications link with data from multiple sources is intended to be within the scope of the invention. For example, the methods and systems of the present invention may be used to load high-speed optical links, such as OC-n links without departing from the scope of the invention. In addition, loading higher-speed Tn and En communications links, where n is an integer greater than 1 is intended to be within the scope of the invention.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for improving utilization of a high-speed time-division multiplexed external network communications link terminated by a signal transfer point, the method comprising:

(a) terminating, at a first port of a multi-port link interface module in a signal transfer point, a first bi-directional, high-speed time division multiplexed external network communications link;
(b) terminating, at a second port of the multi-port link interface module in the signal transfer point, a second bi-directional, high-speed time division multiplexed external network communications link; and
(c) using the multi-port link interface module in the signal transfer point:
  (i) transmitting and receiving data over the first and second bi-directional high-speed external network communications links; and
  (ii) combining data received at the first port from the first external network communications link with internal data processed by the signal transfer point and inserting the combined data into empty outbound timeslots of the second external network communications link, wherein inserting the combined data into the empty outbound timeslots includes transmitting the combined data over the second external network communications link via the second port.

2. The method of claim 1 wherein terminating the first and second external network communications links at a signal transfer point includes terminating a Tn link and a Tm link, n and m each being an integer of at least 1.

3. The method of claim 1 wherein terminating the first and second external network communications links at a signal transfer point includes terminating an En link and an Em link, n and m each being an integer of at least 1.

4. The method of claim 1 wherein terminating the first and second external network communications links at a signal transfer point includes terminating a Jn link and a Jm link, n and m each being an integer of at least 1.

5. The method of claim 1 wherein terminating the first and second external network communications links at a signal transfer point includes terminating an OC-n link and an OC-m, n and m each being an integer of at least 1.

6. The method of claim 1 wherein terminating first and second external network communications links includes terminating first and second external network communications links configured according to different communications standards.

7. The method of claim 1 wherein the first and second external network communications links are of the same speed.

8. The method of claim 1 wherein the second external network communications link is faster than the first external network communications link.

9. The method of claim 1 wherein the first external network communications link is faster than the second external network communications link.

10. The method of claim 1 wherein transmitting and receiving data over the first and second external network communications links includes transmitting and receiving signaling data over the first and second external network communications links.

11. The method of claim 1 wherein transmitting and receiving data over the first and second external network communications links includes transmitting and receiving bearer data over the first and second external network communications links.

12. The method of claim 1 wherein transmitting and receiving data over the first and second external network communications links includes transmitting and receiving signaling and bearer data over the first and second external network communications links.

13. The method of claim 10 wherein combining data received over the first external network communications link with internal data includes combining internal signaling data being routed or processed by the signal transfer point with the received signaling data.

14. The method of claim 11 wherein combining data received over the first external network communications link with internal data includes combining internal signaling data being routed or processed by the signal transfer point with the received bearer data.

15. The method of claim 12 wherein combining data received over the first external network communications link with internal data includes combining internal signaling data being routed or processed by the signal transfer point with the received signaling and bearer data.

16. A method for interconnecting high-speed external network communications links at a signal transfer point comprising:
(a) receiving data from a first high-speed external network communications link at a first port of a multi-port link interface module in a signal transfer point; and
(b) using the multi-port link interface module in the signal transfer point:
  (i) cross-connecting the data received at the first port to a second port of the multi-port link interface module without performing an SS7 layer 3 routing function for the data; and
  (ii) forwarding the data over a second high-speed external network communications link connected to the second port.

17. The method of claim 16 wherein receiving data over a first high-speed external network communications link includes receiving signaling data over the first high-speed external network communications link.

18. The method of claim 16 wherein receiving data over a first high-speed external network communications link includes receiving bearer data over the high-speed external network communications link.

19. The method of claim 16 wherein receiving data over a first high-speed external network communications link includes receiving signaling and bearer data over the first high-speed external network communications link.

20. The method of claim 16 wherein connecting the data to a second high-speed external network communications link includes connecting the data to a second communications link of the same speed as the first external network communications link.

21. The method of claim 16 wherein connecting the data to a second high-speed external network communications link includes connecting the data to a second external network communications link of a different speed than the first external network communications link.

22. The method of claim 16 wherein connecting the data to a second high-speed external network communications link includes multiplexing the data with data from other sources and sending the multiplexed data over the second external network communications link.

23. A method for reading data from and writing data to a memory for combining data from different sources on a high-speed time division multiplexed communications link, the method comprising:
(a) during a first frame interval, writing data processed by a signal transfer point to a first memory bank, the processed data comprising a fraction of a data frame, writing one frame of data received from a first high-speed time-division multiplexed communications link to a second memory bank, leaving a third memory bank unchanged, reading one frame of data from a fourth memory bank, and sending the data read from the fourth memory bank over a second high-speed time-division multiplexed communications link;

(b) during a second frame interval, writing a fraction of a frame of data processed by the signal transfer point into the second memory bank, writing one frame of data received by the first high-speed communications link into the third memory bank, leaving the fourth memory bank unchanged, reading the data written into the first memory bank during the first frame interval, and sending the data read from the first memory bank over the second communications link (c) during a third frame interval, writing a fraction of a frame of data processed by the signal transfer point to the third memory bank, writing one frame of data received over the first communications link into the fourth memory bank, leaving the first memory bank unaltered, reading the data written to the second memory bank during the second frame interval, and sending the data read from the second memory bank over the second communications link;

(d) during a fourth frame interval, writing one frame of data received from the first communications link to the first memory bank, leaving the second memory bank unaltered, writing a fraction of a frame of data processed by the signal transfer point to the fourth memory bank, reading the data written to the third memory bank during the third frame interval, and sending the data read from the third memory bank over the second communications link; and (e) repeating steps (a)-(d) in a round-robin fashion to improve utilization of the second communications link.

24. A signal transfer point comprising:

(a) a multi-port interface module located in the signal transfer point for terminating a plurality of bi-directional high-speed external network communications links, the multi-port link interface module including:

(i) first and second external network communications ports for terminating first and second high-speed, bi-directional time-division-multiplexed external network communications links and for sending data to and receiving data from an external network over the first and second external network communications links;

(ii) an application processor for generating internal data to be sent to the external network (iii) add/drop logic for combining data received over the first communications port with the internal data and inserting the combined data into outgoing timeslots in the second external network communications link; and wherein the combined data is transmitted over the second external network communications link via the second communications port.

25. The signal transfer point of claim 24 wherein the first and second external network communications ports terminate a Tn link and a Tm link, n and m each being an integer of at least 1.

26. The signal transfer point of claim 24 wherein the first and second external network communications ports respectively terminate an En link and an Em link, n and m each being an integer of at least 1.

27. The signal transfer point of claim 24 wherein the first and second external network communications ports respectively terminate a Jn link and a Jm link, n and m each being an integer of at least 1.

28. The signal transfer point of claim 24 wherein the first and second external network communications ports respectively terminate an OC-n link and an OC-m link, n and m each being an integer of at least 1.

29. The signal transfer point of claim 24 wherein the first and second external network communications ports respectively terminate first and second communications links configured according to different communications standards.

30. The signal transfer point of claim 24 wherein the first and second external network communications links are of the same speed.

31. The signal transfer point of claim 24 wherein the second external network communications link is faster than the first external network communications link.

32. The signal transfer point of claim 24 wherein the first external network communications link is faster than the second external network communications link.

33. The signal transfer point of claim 24 wherein the first and second external network communications links carry signaling data.

34. The signal transfer point of claim 24 wherein the first and second external network communications links carry bearer data.

35. The signal transfer point of claim 34 wherein the bearer data includes packetized voice.

36. The signal transfer point of claim 24 wherein the first and second external network communications links carry signaling and bearer data.

37. The signal transfer point of claim 33 wherein the add/drop logic is adapted to combine the signaling data received over the first external network communications link with internally-processed signaling data.

38. The signal transfer point of claim 34 wherein the add/drop logic is adapted to combine the bearer data received over the first external network communications link with internally-processed signaling data.

39. The signal transfer point of claim 36 wherein the add/drop logic is adapted to combine internally-processed signaling data with the signaling and bearer data.

40. The signal transfer point of claim 24 wherein the add/drop logic includes a plurality of memory banks and read/write controllers for controlling the reading of data to and the writing of data from the memory banks.

41. The signal transfer point of claim 40 wherein the read/write controllers are adapted to write one frame of data received from the first external network communications link to a first memory bank while reading data written from a second memory bank to be sent over the second external network communications link.

42. The signal transfer point of claim 24 wherein the add/drop logic is adapted to forward data received over at least one of the first and second external network communications links over a non-channelized communications link.

43. The signal transfer point of claim 24 comprising a usage measurements agent for controlling the add/drop logic to send copies of signaling messages to a billing system.

44. The signal transfer point of claim 24 comprising a surveillance agent for controlling the add/drop logic to send copies of received bearer data to a surveillance system.

45. The signal transfer point of claim 24 comprising a management interface for controlling timeslot assignment by the add/drop logic.

* * * * *